3,064,182
SELF-BALANCING POTENTIOMETER SYSTEMS FOR USE IN ASSOCIATION WITH WEIGHING APPARATUS
John Moorhouse Chilton, Harborne, Birmingham, England, assignor to W. & T. Avery Limited, Birmingham, England, a British company
Filed Apr. 10, 1959, Ser. No. 805,442
Claims priority, application Great Britain Apr. 29, 1958
7 Claims. (Cl. 323—75)

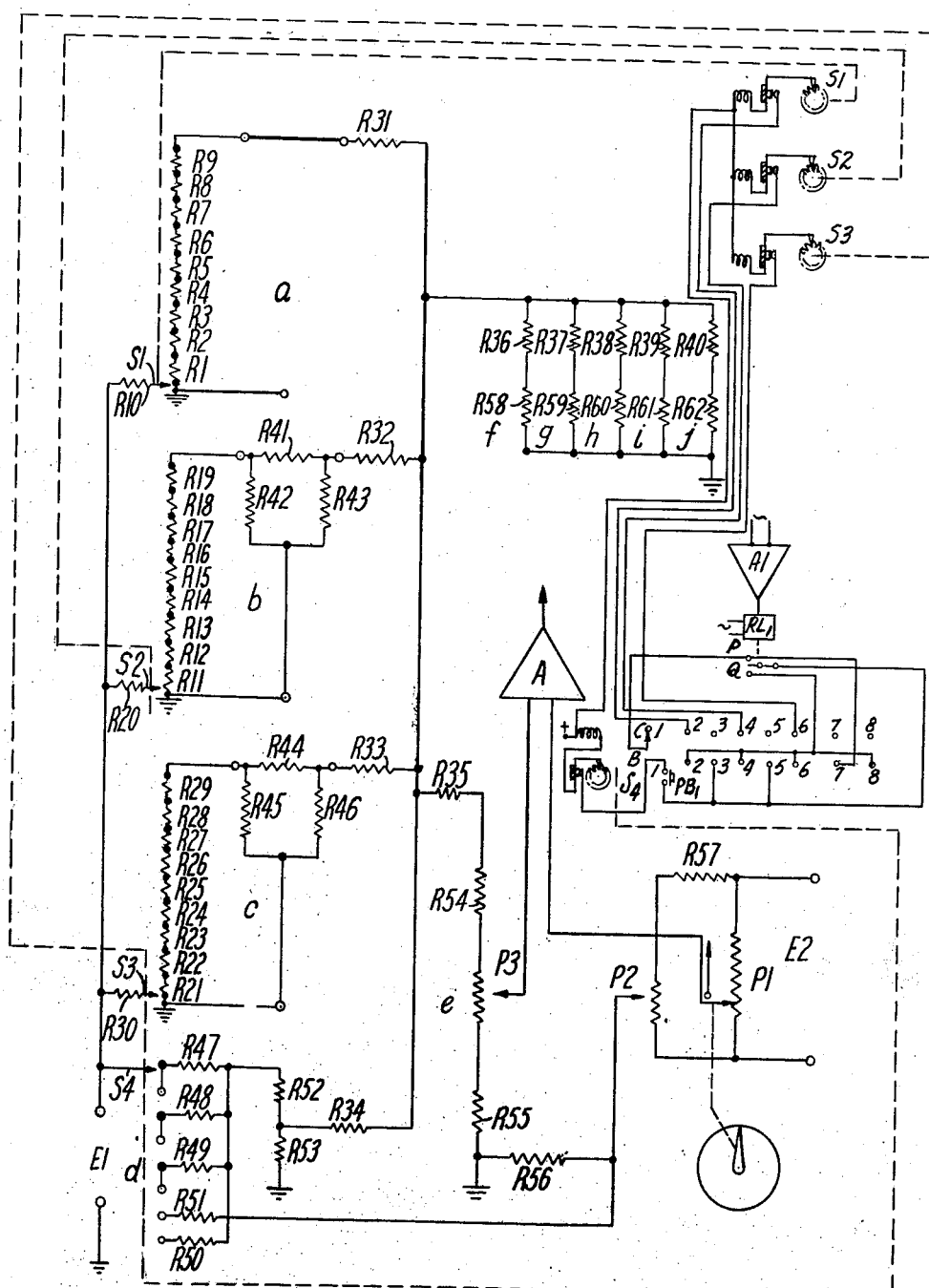

This invention relates to improvements in or connected with self-balancing potentiometer systems incorporated in weighing apparatus, and more particularly is directed to an improvement in or modification of the self-balancing potentiometer system described in the specification of patent application Serial No. 697,926, now Patent No. 3,030,569.

The invention has among its objects to provide a resistive network in place of the Kelvin-Varley type multistage potentiometer employed in the self-balancing potentiometer system disclosed in the prior specification, the network being such that a relative high voltage may be applied across the several potentiometer arms incorporated in the network to minimize errors arising from contact resistances in said arms whereas the network can be employed for balancing the output from means controlled by the weighing means for producing a relatively low voltage proportional to a load.

The present invention consists of an improvement in or modification of the weighing apparatus incorporating a self-balancing potentiometer system according to FIGURE 1 of the specification of patent application Serial No. 697,926 wherein the plurality of balancing stages producing counter voltage increments in each of several orders takes the form of a voltage source, and a resistive network connected to said voltage source, said resistive network including a plurality of parallel-like potentiometer arms identified one with each balancing stage and each consisting of a number of substantially equal resistances connected between fixed contacts on the stepping switch means and in series with each potentiometer arm a relatively high resistance ensuring a substantially constant current through the arm irrespective of the setting of the arm, and an attenuator in series with each arm for proportioning the voltage produced in the several arms in the requisite orders.

Preferred means for carrying the present invention into practice will now be described with reference to the accompanying drawing which diagrammatically illustrates a resistive network according to the invention and the incorporation of this network in the self-balancing potentiometer system disclosed in FIGURE 1 of the parent specification No. 697,926.

As seen in the drawing the network consists of a number of resistive arms connected in parallel, with matching resistors designed in known manner to ensure that the input and output impedances at the terminals of each arm are equal. Some of the arms may be used for injecting voltages into a common point and others may be purely passive arms such as the arm used for picking off the output voltage from the network.

In the illustrated circuit four active potentiometer arms are shown for providing three decade orders of counterbalancing voltage injection, viz: a first decade arm comprising the resistances R1–R9 and designated $a$; a second decade arm comprising the resistances R11–R19 and designated $b$; a third decade arm comprising the resistances R21–R29 and designated $c$; and a biasing arm comprising the resistances R47–R53 and designated $d$. In addition six passive arms are shown consisting of the output arm R54, R55 and P3 designated $e$, and five spare arms comprising the resistances R58–R62 and designated $f–j$ respectively. The resistances R31–R35 are the matching resistors hereinbefore referred to. The counterbalancing supply voltage E1 is applied to the potentiometer arms $a$ to $d$ and the voltage supply E2 is applied across the terminals of the scale potentiometer P1. The voltages E1 and E2 may conveniently be in the ratio of 100 volts and 1 volt respectively.

The resistance units of the potentiometer arms R1 to R9, R11 to R19, R21 to R29, and R47 to R50 are mounted across the fixed contacts of three relay operated stepping switches S1, S2 and S3 and on one of the contact banks of the governing stepping switch S4 respectively. The switches S1, S2 and S3 are actuated by the governing stepping switch S4 under the control of contact means controlled in turn by the phase sensitive amplifier circuit A in an exactly similar manner to that described with reference to FIGURE 1 of the parent specification.

As disclosed in said copending application, relay S4 incorporates two banks of contacts, B and C and is adapted to traverse a moving contact associated with each bank so long as the driving coil of the switch is energized from the current supply. The moving contact of the bank B is connected through the energizing coil of the relay S4 to the positive terminal of a D.C. power supply and the negative terminal of the D.C. power supply is connected both to the moving contact of the relay RL1 and to the 1st, 3rd and 5th contacts of the contact bank B. The moving contact of the bank C is connected to one of the fixed contacts P of the relay RL1, the alternative fixed relay contact Q being connected to the 2nd, 4th, 6th and 8th contacts of the bank B. The 2nd, 4th, and 6th contacts of the bank C are connected to the energizing coils of the stepping relays S1, S2, and S3 respectively. It will be appreciated that when the operation of the governing stepping relay S4 is initiated, by means of for example a push button switch PB1 in the connection of the power supply to the first terminal of the bank B, then the moving contact B moves to the 2nd contact of this bank; simultaneously the moving contact of the bank C is traversed to the 2nd contact of its bank and assuming that the contact P of the relay RL1 is engaged, the stepping relay S1 is thereby energized so that its associated arm of the decade $a$ (R1–R9) are traversed until the circuit passes through its balanced condition whereby the output of the phase-conscious stage is reversed in phase, thus to result in the engagement of the alternative contacts Q of the relay RL1.

The decade arms $a$, $b$ and $c$ are conveniently identical each consisting of equal resistors providing equal voltage increments. In the arm $a$ a resistor R10 is connected between one side of the counterbalancing voltage supply E1 and the moving contact of the stepping switch S1. R10 is made of a large value as compared with R1 to R9 so that a substantially constant current will flow through R10 irrespective of the setting of the moving contact of the switch S1 and the voltage drop from the moving contact of S1 to earth will be substantially proportional to the resistance from the selected tapping on the chain R1 to R9 to earth according to the position of the moving contact. In practice R10 is limited by the supply voltage E1, and the output voltage at the end of the arm (i.e. at the junction of R9 and R31) is attenuated by the sections of the resistance chain R1 to R9 present between the moving contact and R31. After selecting a suitable supply voltage E1 and a value for R10, a practical value is chosen for the units R1–R9 in series therewith and the tapping points are calculated so as to give uniform increments of voltage at the output of the arm according to the setting of the moving contact S1. By way of example E1, R10 and R1 to R9 may be of the order of 100 volts, 40,000 ohms and 9,000 ohms respectively.

The arm b of the next decade is identical with arm a but a π attenuator R41, R42 and R43 is inserted between the potentiometer chain R11 to R19 and the matching resistor R32. In the case of a decade system an attenuation factor of 10 will be employed.

The arm c is identical with arms a and b but includes a 100 to 1 π attenuator R44, R45 and R46 in series therewith.

It will be appreciated that with the 10 step arms as shown subdivision may be made for less than 10, e.g. four divisions to present ¼ lbs., by using only four steps of the arm and choosing a suitable attenuation factor. Furthermore, the arm need not be confined to 10 steps; for example the resistor arm may be divided into 24 equal parts covering all step divisions up to 25, say 20 to represent hundredweights, 14 to represent pounds or 16 to represent ounces.

In the self-balancing potentiometer system of specification No. 697,926 the stages of the Kelvin-Varley potentiometer employed therein were biased during the sequential operation of the selector stages S1, S2 and S3 by the use of the resistances R34 to R38 seen in FIGURE 1 of the prior specification, which resistances were inserted in and taken out of the bridge circuit by the governing stepping switch S4. In the present system this biasing function is effected by the arm d again under the control of the governing stepping switch S4. In the present arrangement current from the supply E1 through one or other of the three resistors R47 to R49 as determined by the governing stepping switch S4 according to the order being balanced, results in a voltage drop across the resistance R53 which is fed via the resistors R52 and R34 to the common junction of the arms a, b, and c. The values of the resistors associated with the arm d are calculated to give the required biasing voltage at the output equal to one unit increment in each respective order according to the position of the moving contact of the governing stepping switch S4 substantially in the manner described in the aforesaid prior specification.

In the prior system checking functions were obtained by the resistances R39 to R42 and a like function is obtained in the present arrangement by resistances R51 and R50 to provide checking step voltages which are impressed across R56 in series with the output of the scale potentiometer P1 so as to produce in sequence an unbalance equal to one division in opposite senses with respect to the balancing point.

In the output arm designated e the resistors R54 and R55 are proportioned so that the potential at the centre of the potentiometer P3 is approximately equal to the full scale output derived from the scale potentiometer P1 when the stepping relays S1, S2 and S3 are set to the digital reading equivalent to the full scale reading of the weighing apparatus, the final adjustment being carried out by the potentiometer P3.

In the system illustrated in the accompanying drawing five auxiliary arms f to j are shown. However if these auxiliary arms are not required in a particular installation these resistances can be replaced by an equivalent single resistor. Thus in one example the system may be employed for taring the weight of an empty container by the substitution of the auxiliary arms designated f, g, h, and i by a second self-balancing potentiometer system, the additional potentiometer system being arranged to be automatically balanced to accord with the unknown weight of an empty container measured by the system, and if desired being adapted to provide an indication of the tare weight of the container, the container is then filled with material and the main network is arranged to be thereby automatically balanced to provide an indication of the net weight of material deposited in the container.

To cover tolerances in the coupling of the potentiometer P1 to the weighing apparatus a zero adjustment is necessary, this function being provided by the potentiometer P2 in the earlier specification. In the present system the potentiometer P2 is fed through the resistor R57 from the same supply as that which is connected to the scale potentiometer P1 and the system is arranged so that the output across the potentiometers P1 and P2 can be set to zero by the adjustment of the potentiometer P2 when the indicator of the weighing apparatus is at zero.

It will be appreciated that the above described circuit can be energized by an A.C. or D.C. voltage provided that the appropriate type of amplifier is incorporated.

I claim:

1. In a self-balancing system for use in sensing weights and including means for producing a supply voltage proportional to a load being weighed, a fixed counterbalancing voltage source having a pair of separate terminals; a resistance network having an output and a plurality of balancing stages producing countervoltage increments in a plurality of orders corresponding respectively to different units of weight measurement, each of said balancing stages including a first resistor and a potentiometer having two separate resistor connecting terminals and an arm connected in series with said first resistor, the value of said first resistor being relatively high in comparison to the value of the increment resistors connected between said potentiometer terminals for establishing a substantially constant current flow through said arm irrespective of the setting thereof; means connecting the first resistors of said balancing stages to one of said counterbalancing voltage source terminals, means connecting corresponding ones of said potentiometer terminals in parallel to the other of said counterbalancing voltage source terminals; means connecting the other of said potentiometer terminals in parallel to said network output; an attenuator in each of the lower order balancing stages for attenuating the voltage output of each of said lower order balancing stages; amplifier means for making a comparison between the output voltage of said network with said load proportional supply voltage and having separate input sides respectively connected to said network output and said load proportional voltage supply source; means controlled by said amplifier means and being operable in response to a change in the sense of unbalance in said comparison to set said potentiometer arms in sequence to positions corresponding to the various orders of digits representing the weight measurement, biasing means arranged in said network separately of said potentiometers for automatically adding to said network output increments of voltage of predetermined values corresponding to the increments identified with each of said balancing stages for changing the sense of balance of said comparison for each of said balancing stages, and resistance means in each of said balancing stages for maintaining input and output impedances at the terminals of each of said potentiometer arms substantially equal.

2. In a self-balancing system for use in sensing weights and including means for producing a supply voltage proportional to a load being weighed, a fixed counterbalancing voltage source having a pair of separate terminals; a resistance network having an output and a plurality of balancing stages producing countervoltage increments in a plurality of orders corresponding respectively to different units of weight measurement, each of said balancing stages including a first resistor and a potentiometer having two separate resistor connecting terminals and an arm connected in series with said first resistor, the value of said first resistor being relatively high in comparison to the value of the increment resistors connected between said potentiometer terminals for establishing a substantially constant current flow through said arm irrespective of the setting thereof; means connecting the first resistors of said balancing stages to one of said counterbalancing voltage source terminals, means connecting corresponding ones of said potentiometer terminals in parallel to the other of said counterbalancing voltage source terminals; means connecting the other of said potentiometer terminals in parallel to said network output; an attenuator in each of the lower order balancing stages for attenuating the voltage output of each of said lower order balancing stages; amplifier means for making a comparison between the output voltage of said network with said load proportional supply voltage and having separate input sides respectively connected to said network output and said load proportional voltage supply source; a governor switch, a plurality of stepping switches under the control of said governor switch and operably connected one to each of said potentiometer arms for individually controlling the movement thereof, switch means under the control of said amplifier means and operable in response to a change in the sense of unbalance in said comparison, to actuate said governor switch, said stepping switches being operable by actuation of said governor switch to set said potentiometer arms in sequence to positions corresponding to the various orders of digits representing the weight measurement, and biasing means arranged in said network separately of said potentiometers for automatically adding to said network output increments of voltage of predetermined values corresponding to the increments identified with each of said balancing stages for changing the sense of balance of said comparison for each of said balancing stages.

3. Weighing apparatus according to claim 2 including biasing means comprising resistances identified with the several orders of units to be measured, said resistances being arranged so as to be sequentially introduced into the system by the governing stepping switch so as to bias the output voltage of the arms by one unit increment of the order being balanced.

4. Apparatus according to claim 3, wherein two further resistances are arranged to be sequentially introduced into the system by the governing stepping switch after the system has been balanced so as to then upset the bridge balance in opposite senses thereby to check the correct functioning of the system.

5. The system as defined in claim 2 wherein the incremental resistors connected between said potentiometer terminals of each of said potentiometers are equal and said attenuator is connected in parallel relationship across said potentiometer terminals.

6. The system as defined in claim 1 wherein said resistance means comprises a resistor connected in each of said balancing stages between said other terminal of said potentiometer associated with each balancing stage and the output of said network.

7. The system as defined in claim 2 wherein said first resistors are of equal value.

References Cited in the file of this patent

UNITED STATES PATENTS

| | | |
|---|---|---|
| 2,733,911 | Thurston | Feb. 7, 1956 |
| 2,864,999 | Sullivan | Dec. 16, 1958 |
| 2,894,197 | Berry | July 7, 1959 |
| 2,951,200 | Critchlow | Aug. 30, 1960 |